(12) United States Patent
Ben Hadj Said et al.

(10) Patent No.: US 12,199,860 B2
(45) Date of Patent: Jan. 14, 2025

(54) DYNAMIC CONFIGURATION OF THE SCHEDULING OF TRANSMISSION OF STREAMS IN DETERMINISTIC NETWORKS

(71) Applicant: COMMISSARIAT A L'ENERGIE ATOMIQUE ET AUX ENERGIES ALTERNATIVES, Paris (FR)

(72) Inventors: Siwar Ben Hadj Said, Gif-sur-Yvette (FR); Michael Boc, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/694,392

(22) PCT Filed: Nov. 7, 2022

(86) PCT No.: PCT/EP2022/080909
§ 371 (c)(1),
(2) Date: Mar. 21, 2024

(87) PCT Pub. No.: WO2023/088702
PCT Pub. Date: May 25, 2023

(65) Prior Publication Data
US 2024/0406098 A1   Dec. 5, 2024

(30) Foreign Application Priority Data
Nov. 19, 2021   (FR) ........................... 2112233

(51) Int. Cl.
*H04L 45/00* (2022.01)
*H04L 47/28* (2022.01)
*H04L 47/625* (2022.01)

(52) U.S. Cl.
CPC .............. *H04L 45/38* (2013.01); *H04L 47/28* (2013.01); *H04L 47/625* (2013.01)

(58) Field of Classification Search
None
See application file for complete search history.

(56) References Cited

U.S. PATENT DOCUMENTS 12,040,995 B2 * 7/2024 Iwasawa ............... H04L 47/826
2022/0104062 A1 * 3/2022 Aijaz ................ H04W 28/0268

OTHER PUBLICATIONS

On-line Traffic Scheduling Optimization in IEEE 802.1Qch based Time-Sensitive Networks (Quan et al, IEEE 22nd International Conference on High Performance Computing and Communications, Dec. 14-16, 2020) (Year: 2020).*
Long-distance Deterministic Transmission among TSN Networks: Converging CQF and DIP (Tan et al, 2021 IEEE 29th International Conference on Network Protocols (ICNP), Nov. 1-5, 2021) (Year: 2021).*

(Continued)

*Primary Examiner* — Yaotang Wang
(74) *Attorney, Agent, or Firm* — BakerHostetler (57) ABSTRACT

A fast and dynamic configuration method for scheduling the transmission of flows in deterministic networks is provided. This method allows, when a new flow appears within the network, a decision to be made concerning a new schedule for transmitting flows, and allows it to be deployed in the network so as to assume this new flow without compromising the QoS of the other flows already present in the network.

12 Claims, 8 Drawing Sheets

(56) References Cited

OTHER PUBLICATIONS

Nayak, et al., "Incremental flow scheduling and routing in Time-Sensitive Software-defined networks", IEEE transactions on industrial informatics, vol. 14, No. 5, May 2018.
Raagaard, et al., "Runtime Reconfiguration of Time-Sensitive Networking (TSN) Schedules for Fog Computing", IEEE Fog World Congress (FWC), 2017.
Pop, et al., "Enabling Fog Computing for Industrial Automation Through Time-Sensitive Networking (TSN)", IEEE Communications Standards Magazine, pp. 55-61, Jun. 2018.
Nasrallah, et al., "Reconfiguration Algorithms for High Precision Communications in Time Sensitive Networks: Time-Aware Shaper Configuration with IEEE 802.1Qcc (Extended Version)", arxiv, Cornell University, 2019.
Quan, et al., "On-line Traffic Scheduling optimization in IEEE 802.1Qch based Time-Sensitive Networks", 2020 IEEE 22nd International Conference on High Performance Computing and Communications; IEEE 18th International Conference on Smart City; IEEE 6th International Conference on Data Science and Systems (HPCC/SmartCity/DSS), pp. 369-376, 2020.

* cited by examiner

DYNAMIC CONFIGURATION OF THE SCHEDULING OF TRANSMISSION OF STREAMS IN DETERMINISTIC NETWORKS

CROSS-REFERENCE TO RELATED APPLICATIONS

This application is a National Stage of International patent application PCT/EP2022/080909, filed on Nov. 7, 2022, which claims priority to foreign French patent application No. FR 2112233, filed on Nov. 19, 2021, the disclosures of which are incorporated by reference in their entireties.

FIELD OF THE INVENTION

The present invention is in the field of telecommunication networks, and more specifically relates to a method for dynamically reconfiguring the schedule for transmitting multi-QoS flows in deterministic or Time-Sensitive Networking (TSN) networks.

BACKGROUND

TSN is a set of standards, defined by the IEEE 802.1 working group, that extend the Ethernet network in order to meet the strict requirements of real-time communications.

This type of network is intended to be mainly used in industrial networks, intra-vehicular networks, 5G/6G core networks.

Transmitting data from critical real-time applications (for example, fast regulations, acquiring signals in electrical networks or controlling movements) and high data intensity applications (for example, video flows or computer systems) is currently implemented in separate networks in order to avoid mutual interference. The increasing flexibility and digitization of working processes have nevertheless required increasing merging of computing and industrial use, and consequently merging of previously separated systems. By extending and adapting the existing Ethernet standards, TSN creates a convergence between information technology (IT) and industrial exploitation technology (OT) in industrial networks. This means that the critical real-time data and the high data intensity applications can be implemented on a common Ethernet cable without interfering with each other.

The TSN specifications (IEEE 802.1) provide deterministic services, allowing real-time transmission of data in a predictable frame within a known time space, in industrial environments, such as the applications for controlling machines in production processes, from the sensor to the cloud. TSN offers guaranteed latency and quality of service with time synchronization.

The various documents of the TSN standard offer a complete real-time communication solution when they are used together in a concerted manner. However, each standard specification is autonomous and it can be used alone. The specifications can be consolidated into three categories:
- time synchronization corresponding to standard IEEE 802.1 AS, where all the peripherals involved in real-time communication must have a common understanding of time;
- scheduling corresponding to standard IEEE 802.1 Qbv and traffic shaping where all the peripherals involved in real-time communication comply with the same rules when processing and transmitting communication packets;
- selecting communication paths, reserving paths and fault tolerance where all the peripherals involved in real-time communication comply with the same rules when selecting communication paths and reserving bandwidth and timetables, optionally using several simultaneous paths to obtain a fault tolerance.

Standard IEEE 802.1 Qbv, which is one of the key TSN standards and is referred to as Qbv throughout the remainder of the description, proposes a mechanism for providing limited latencies. It allows the switches of a TSN network to control the traffic in queues of egress ports of the switches, according to a predefined transmission schedule (the IEEE 802.1 Qbv time scheduler), and thus guarantees the quality of the priority traffic. The IEEE 802.1 Qbv time scheduler is designed to separate communications over the Ethernet network into fixed length repeated time cycles. Within these cycles, various time slots can be configured and assigned to one or more of the eight Ethernet priorities.

Figure 1:
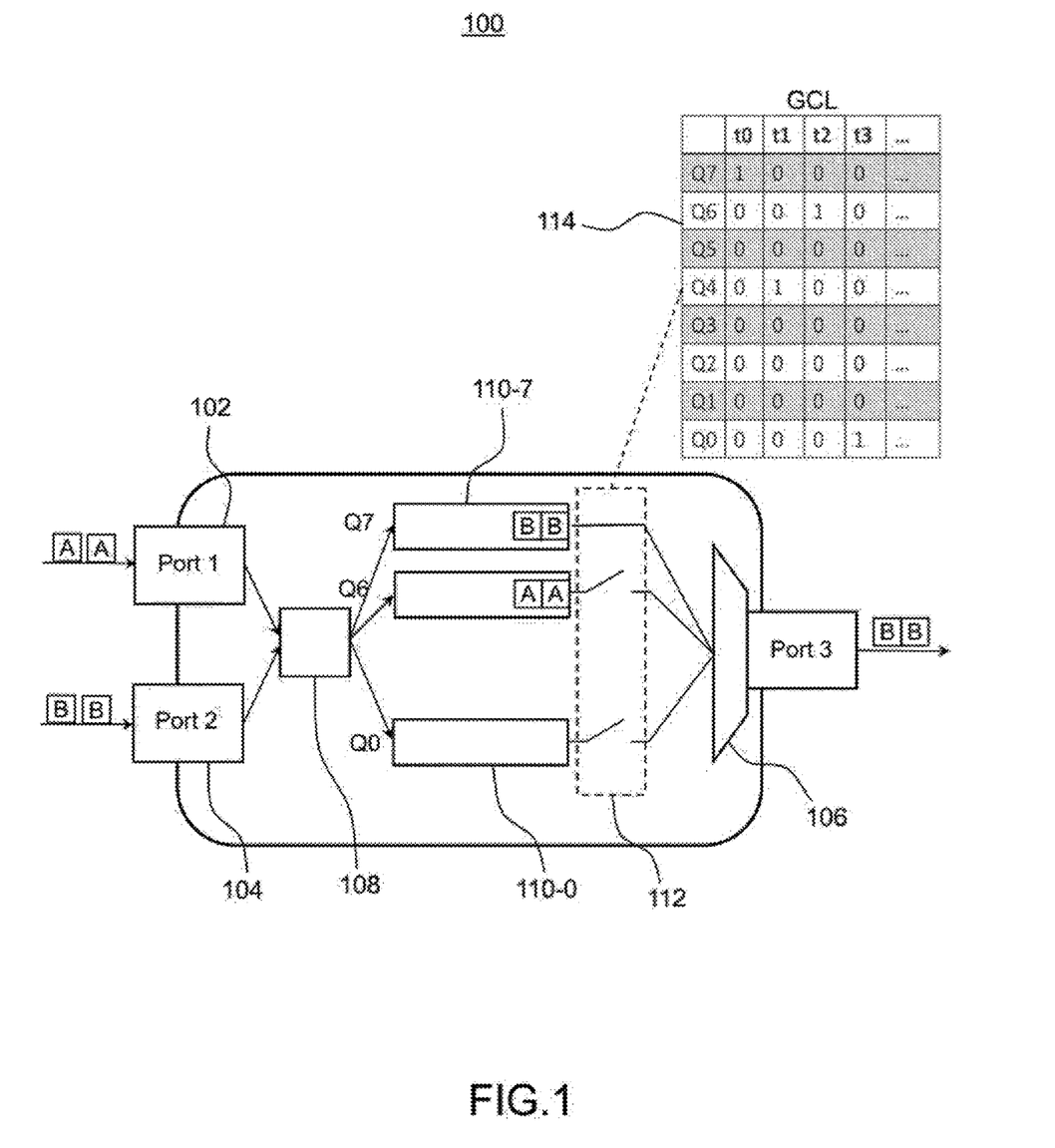
FIG. 1 is a simplified example of the structure of a TSN switch.

FIG. 1 schematically illustrates the structure of a switch for applying the Qbv scheduling principle in a TSN network made up of a plurality of source/destination devices connected to switches via Ethernet links.

The switches act as intermediates between data flow transmitter terminals or "Talker(s)" and receiver terminals or "Listener(s)" by managing the multiplexing of the data, i.e., their reception, their processing and their retransmission.

In order to simplify the description, FIG. 1 shows a TSN switch 100 with only two ingress ports and a single egress port, by way of a non-limiting example concerning the number of ingress and egress ports. A first data flow, made up of data fragments 'A', is received by a first ingress port 102, and a second data flow, made up of data fragments 'B', is received by a second ingress port 104.

The output of each ingress port is coupled to a flow distribution module 108 that assigns the data of each flow to an appropriate queue, eight in general (Q0 or 110-0 to Q7 or 110-7), according to the priority of each flow.

According to the definition of the Ethernet frames in standard IEEE 802.1 Q, a priority filter determines which specific flow is transmitted to the corresponding priority queues as a function of a priority code point (PCP). Programmed traffic (which has the highest priority by default) enters a priority queue, and non-programmed traffic enters a non-priority queue.

The output of the queues is associated with a structure 112 of logic gates, with each logic gate having two "open" or "closed" states. The current state of each gate is a function of the content of a control list GCL (Gate Control List) 114. When a gate is in an open state at a given time, the frames that are located in the queue associated with this gate can pass through and be transmitted to the egress port 106 via the analog switch 112. This is illustrated, for example, for the queue Q7 with a bit set to '1' in the GCL at the time t0, which then allows the data B to be transmitted to the egress port 106. When a gate is in a closed state (then corresponding to a bit set to 0 in the list), the frames that are located in the queue associated with this gate cannot be transmitted in the network.

Although the Qbv mechanism itself is rather simple, there is an inherent complexity involved in generating GCLs, with the problem being finding the correct times for opening and closing the gates.

Moreover, as soon as the configuration of the Qbv mechanism is considered on all the TSN switches located in a network, the complexity of establishing a suitable GCL for each switch increases considerably. It has been found that summarizing communication schedules in real scenarios often proves to be an NP-complete problem. However, an algorithm does not currently exist that generates a polynomial-time communication schedule.

Given that the Qbv standard is important for future industrial communication systems, in particular in smart factories fitted with autonomous manufacturing systems, a requirement exists for an algorithm that allows a Qbv configuration to be established quickly and for this configuration to be deployed without disrupting the flows that already circulate in the network.

In these systems, appliances such as robots, actuators and sensors must quickly communicate with one another because they must react very quickly as a function of the command and control system, or as a function of certain unexpected events. In this way, these systems can guarantee the accuracy of a manufacturing process and minimize any defects.

Also, in order to be able to respond to any scenarios contemplated in Industry 4.0 where the production lines are more reconfigurable (which involves dynamics in the industrial network), or even to be able to respond to the scenario of integrating TSN into the 5G/6G core where the flows are not known in advance, a requirement exists for an algorithm for scheduling flows that operates on-line, i.e., which is dynamic, for incrementally installing application flows in the TSN network.

Moreover, in order for it to be used on-line, such an algorithm must have a very short execution time, with an order of magnitude of less than a few seconds.

Some approaches exist that partly address these problems.

Standard IEEE 802.1 Qcc provides two main approaches (centralized and distributed) for configuring the TSN [IEEE 802.1 Qcc] mechanisms. In this standard, it should be emphasized that the centralized approach is most favored for providing the IEEE 802.1 Qbv configuration. However, this standard does not provide the algorithms that allow the GCL to be deployed in the network to be appointed and generated.

In literature, the main approach is generally based on engineering tools: simulation tools such as "RTaW-Pegase" or even mathematical optimization tools such as ILP ("Integer Linear Programming") formulations or SMT ("Satisfiability Modulo Theories") solvers.

However, these engineering tools are not suitable for an incremental and dynamic configuration such as that of IEEE 802.1 Qbv. Indeed, in order for these tools to be able to provide the correct Qbv configuration to be deployed, having prior knowledge of all the flows that could circulate in the TSN network would be necessary. Even by using these tools to generate the new IEEE 802.1 Qbv configuration for each new flow, latencies would be added in the configuration as a result of having to retrieve the list of flows that exist in the network, the topology, the features of the new flow, and of having to provide the tool with this information in order to find the Qbv configuration to be deployed. This could last for a few hours before being able to accept/reject the new flow and deploy the appointed configuration. For these reasons, these engineering tools are more suitable for determining a configuration for a closed network where the flows are known in advance and where there are no new flows while the network operates. They are intended for off-line use before deploying the network.

Numerous publications propose solutions for computing the IEEE 802.1 Qbv configuration off-line.

Some publications relate to the problem of on-line configuration of the IEEE 802.1 Qbv mechanism.

The article by N. G. Nayak, F. Durr, K. Rothermel entitled "Incremental flow scheduling and routing in Time-Sensitive Software-defined networks", IEEE transactions on industrial informatics, volume 14, No. 5, May 2018, describes an algorithm for incremental scheduling of periodic critical flows. The algorithm is based on various ILP formulations for finding the optimal solution each time. However, this paper only considers scheduling the flows on the terminals using the TSN network, based on "Openflow switches", without support from 802.1 Qbv. Thus, the Qbv mechanism is only applied to the input of the network, leaving two unresolved questions: "how to manage the scheduling of the flows originating from different TSN access switches?", and "how the switches to the core network manage the interference that could occur between flows with the same priority originating from two different switches and using the same output queue?".

In the articles by P. Pop, M. L. Raagaard, M. Gutierrez, W. Steiner entitled "Enabling Fog Computing for Industrial Automation Through Time-Sensitive Networking (TSN)", IEEE Communications Standards Magazine, June 2018; and by M. L. Raagaard, P. Pop, M. Gutierrez, W. Steiner entitled "Runtime Reconfiguration of Time-Sensitive Networking (TSN) Schedules for Fog Computing", IEEE Fog World Congress (FWC), 2017, the authors propose a heuristic for reconfiguring IEEE 802.1 Qbv "at runtime". The objective of this heuristic is to set up time ranges or time slots for the TSN traffic by analyzing the ongoing cycle. In order to compute the Qbv cycle duration, the heuristic adopts the "hyper-period" method, i.e., where the cycle duration corresponds to the smallest common multiple (ppcm) of all the periods of the TSN flows. To this end, prior knowledge is required of the TSN flows that may be present in the network. One disadvantage is that the hyper-period method makes the allocation of the resources more complicated, and the duration of execution of the heuristic increases as a function of the adopted cycle time. Indeed, the number of time slots to be reserved depends on the period of the flow and on the cycle duration. For example, if the cycle lasts 1 ms and the flow has a period of 200 µs, 5 time slots need to be set for this flow. The greater the duration_cycle:flow_period ratio, the more complex the search for available time slots in the ongoing cycle. Moreover, this article does not explain how the heuristic manages the reservation of time slots along the entire routing path for each flow.

Also, no known solution exists for dynamically computing and configuring the schedule for flow transmissions in TSN switches, as and when the flows arrive, without having to previously know all the flows that can circulate in the TSN network.

The present invention addresses these various requirements.

SUMMARY OF THE INVENTION

An aim of the present invention is a method, and a device for implementing said method, for quickly and dynamically computing a configuration for scheduling the transmission of flows in deterministic networks.

The present invention notably addresses the on-line IEEE 802.1 Qbv configuration, as and when new flows arrive, in a network of TSN switches supporting the IEEE 802.1 Qbv mechanism.

The method of the invention allows, when one or more new flows appears within a deterministic network, a new schedule for transmitting flows to be quickly determined on-line, and allows the new schedule to be deployed in the network so as to manage this new flow or these new flows without compromising the quality of service (QoS) of the other flows already present in the network.

The invention proposes an efficient distribution of the time resources (i.e., of the time slots) between the TSN access switches (i.e., the switches directly connected to the data flow transmitter and receiver terminals) in order to ensure the temporal isolation of the flows and to thus provide a solution to the interference that could occur between flows with the same priority reaching the same switch and using the same queue for the same egress port.

Advantageously, the time resources are distributed dynamically and can be adapted according to the number of flows served by each TSN switch.

In one embodiment, time slots are reserved for the network control frames (for example, IEEE 802.1 AS time synchronization frames, LLDP topology discovery frames, etc.) and the remainder of the time ranges available on a basic cycle is distributed, according to the method of the invention, between the TSN access switches.

Advantageously, the allocation of time slots is based on an algorithm that is less complex than those disclosed in the prior art, and it allows a flow to be quickly accepted or rejected.

Unlike known scheduling methods, the solution proposed for computing a new schedule adopts a cycle with a fixed duration that is reduced to a reference period, and in which the period of a periodic flow can be a multiple of the cycle. Advantageously, this allows the number of time intervals in the GCL to be effectively reduced, allows updating of the GCL to be facilitated and makes the configuration of the GCL simpler and more efficient.

Still advantageously with respect to the conventional hyper-period method, the proposed method allows faster computing of the scheduling of the flows, while guaranteeing low latency and effectively reducing the execution time.

The present invention can be implemented in industrial networks (the fields of future factories, Industry 4.0/highly reconfigurable factories), intra-vehicular networks (any type of vehicle fields: automobile, trucks, bus, train, boat, etc.), or in the core of the 5G/6G network (for conveying real-time communications).

In order to obtain the desired results, a method is proposed for dynamically reconfiguring a schedule for transmitting data flows in a time-sensitive deterministic network. The data flows are transmitted by transmitter terminals to receiver terminals via switches consolidating access switches $SW_j$ coupled to the transmitter and receiver terminals, and network core switches for routing the flows between the access switches, with the switches being configured to apply flow transmission cycles according to a flow transmission schedule defined by a time scheduler, the method being computer-implemented and comprising steps of:
  receiving at least one request to add a new flow $ST_i$ to the network, with the new flow having to be transmitted from a transmitter terminal to an access switch $SW_j$;
  determining whether a flow transmission schedule is ongoing for said access switch $SW_j$;
  determining, if a flow transmission schedule is ongoing, whether there are sufficient time slots available in order for the access switch $SW_j$ to transmit the new flow according to the current schedule; or
  if no flow transmission schedule is ongoing:
    computing a new flow transmission schedule such that:
      the duration of the transmission cycle is the same for all the switches of the network;
      each transmission cycle comprises the same number of time slots for transmitting the flows; the time slots of a given cycle are distributed between all the access switches of the network; and
    determining, for the access switch $SW_j$, if there are sufficient time slots available, from among the number of time slots allocated thereto, in order to transmit the new flow according to the new schedule; and
  allocating the time slots required for the transmission of said new flow thereto, if there are sufficient time slots available in order for the access switch $SW_j$ to transmit this new flow according to the current schedule or according to the new schedule.

The expression "time slots required for its transmission" relates to one or more time slots over a cycle.

The invention can be implemented according to alternative or combined embodiments, where:
  The step of determining whether a flow transmission schedule is ongoing for said access switch $SW_j$ comprises steps of:
    identifying an egress port $P_k$ of said access switch $SW_j$ in order to transmit the new flow in the network;
    retrieving the current configuration of the transmission schedule for said egress port $P_k$; and
    determining whether a flow transmission schedule is ongoing on said egress port $P_k$.
  The step of computing a new flow transmission schedule comprises steps of:
    determining the number of access switches in the network;
    retrieving a predefined value or computing a value for a fixed reference duration for a transmission cycle;
    dividing the fixed reference duration into a plurality of time slots of equal duration, with the duration of a time slot being equal to the time required to send the smallest frame of a flow from among the existing flows; and
    assigning each access switch a number of time slots from among the plurality of time slots over the fixed reference duration, with the number of time slots allocated to each access switch depending on the number of existing flows passing through each access switch.
  The predefined or computed value of the fixed reference duration corresponds either to the smallest period value from among the periods of critical flows received upon starting the system, or to the greatest common divider of all the periods of the critical flows from among the existing flows.
  Before the step of allocating time slots for a new flow, the method comprises a step involving reserving one or more control time slots for the network control traffic.
  After the step of determining whether there are sufficient time slots available in order for the access switch $SW_j$ to transmit the new flow according to the current schedule or according to the new schedule, the method comprises a step of adding the new flow to a list of flows without allocating time slots, if there are no sufficient time slots available for transmitting the new flow.
  The method further comprises steps of processing the list of flows without allocating time slots, with said steps involving searching for a non-allocated flow, if time slots exist that are not used by the other access switches other than the one receiving said non-allocated flow, and, if so, steps involving allocating at least one of said unused time slots to said non-allocated flow according to the priority of said non-allocated flow.

The method further comprises, if no time slots exist that are not used by the other access switches other than the one receiving said non-allocated flow, steps involving determining whether said flow has a higher priority than an existing flow, and, if so, steps involving freeing-up the time slots from an existing lower priority flow in order to allocate it to said non-allocated flow.

The invention also relates to a device for dynamically reconfiguring a schedule for transmitting data flows in a time-sensitive deterministic network, with the data flows being transmitted by transmitter terminals to receiver terminals via switches consolidating access switches $SW_j$ coupled to the transmitter and receiver terminals, and network core switches for routing the flows between the access switches, with the switches being configured to apply flow transmission cycles according to a flow transmission schedule defined by a time scheduler, the device comprising means for implementing the steps of the method of the invention.

Advantageously, the method of the present invention can be implemented in the two network management infrastructures disclosed in standard IEEE 802.1 Qcc, namely, the centralized infrastructure and the distributed infrastructure.

In one embodiment for the centralized approach, the method is executed on the central controller CNC ("Central Network Controller").

In one embodiment for the distributed approach, each switch of a TSN network determines the allocation of time slots and publishes this allocation to its neighbors.

The invention also relates to a computer program product that comprises code instructions for carrying out the steps of the method of the invention, when the program is executed on a computer.

BRIEF DESCRIPTION OF THE DRAWINGS

Further features and advantages of the invention will become apparent from the following description and from the figures in the appended drawings, in which.

DETAILED DESCRIPTION

The general principle of the invention for proposing an architecture with a dynamic configuration for scheduling transmissions of frames on TSN switches is based on an approach that allows a decision to be quickly and dynamically made to allocate or to free up time slots for the flows.

It should be noted that the expressions "time range", "time slot" are equally used to designate a duration for allocating time resources.

The detailed description is provided for a deterministic TSN network environment according to standard IEEE 802.1 and the associated standards. Throughout the description, the various terms used with an acronym such as Qbv, Qcc, AS, etc., must be understood to be referring to said term according to the corresponding standard for standard IEEE 802.1. Thus, for example, the Qbv cycle means the cycle as defined by standard IEEE 802.1 Qbv.

In order for the scheduling to be able to provide the limited latencies required within the context of deterministic networks, all the TSN switches, as well as the terminals connected to a TSN network, are considered to be perfectly synchronized with one another, notably in accordance with standard IEEE 802.1 AS.

In the aforementioned literature, the duration of the Qbv cycle, called "hyper-period", in principle is determined based on the periods of the periodic critical flows (the ppcm), which significantly increases the complexity of introducing new flows into a running cycle.

In the present invention, the duration of a Qbv cycle is considered to be a fixed duration, which can correspond either to the smallest period value from among the periods of critical flows received upon starting the system, or to the greatest common divider (pgcd) of all the periods of the critical flows.

In order to allocate a time slot to a given flow, the method of the invention will seek a time slot available over the entire Qbv cycle and will allocate it and reserve it to this flow. This approach thus allows the complexity of allocating time slots to be reduced.

Since the flows do not necessarily have the same period, the method can process flows whose period coincides with the cycle duration, and the time slot allocated to this type of flow is then entirely contained within the duration of the Qbv cycle. The method also allows flows to be processed whose period is a multiple of the cycle duration, and the time slot allocated to this type of flow is then distributed over several cycles. For example, for a flow whose period is 2 times the duration of the cycle, a time slot reserved for this type of flow will be used for one in two cycles.

The topology of the TSN networks for implementing the invention is considered to comprise two categories of TSN switches: (i) access switches corresponding to TSN switches that are directly connected to terminals that use the network (provide and/or receive a flow); and (ii) core network switches that are TSN switches with the role of routing and transferring flows between access switches and a final switch coupled to a destination terminal for a flow. The method of the present invention runs for access switches only in order to limit the distribution of the time slots over these switches because they are the ingress port for flows entering the TSN network. The method does not allocate any time slots on the core network switches because they only route the flows originating from the access switches, by applying the flow allocation that is determined on the access switches.

Figure 2:
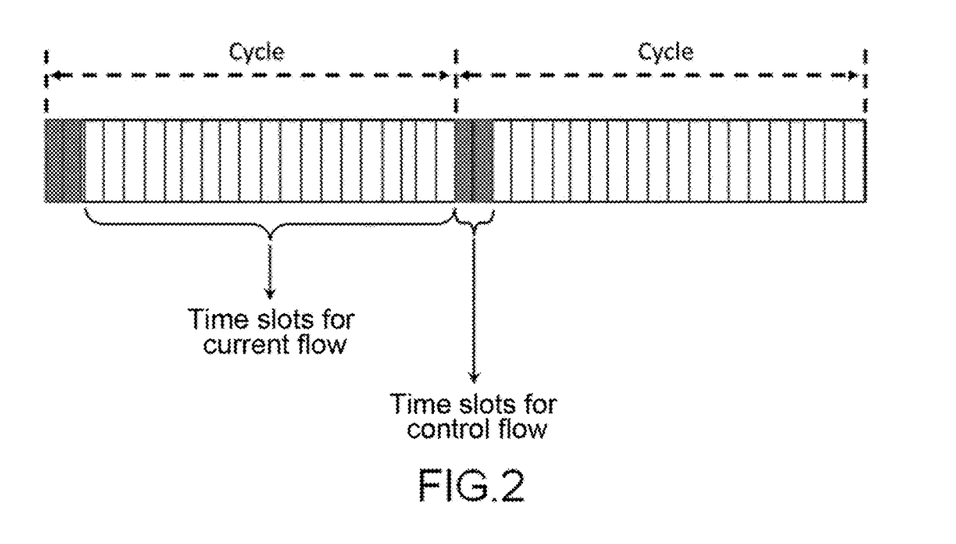
FIG. 2 illustrates the reservation of control time slots for the network control traffic in a basic Qbv cycle.

With the TSN standard involving a set of dedicated time slots for the network control traffic exchanged between the switches being reserved, the method of the invention, before distributing the time slots between the access switches for the data flows, reserves a set of "control time slots" for the network control traffic (for example, IEEE 802.1 AS time synchronization messages, LLDP topology discovery messages, etc.). FIG. 2 illustrates the reservation of two control time slots in the set of time slots of a cycle.

The method for allocating time slots of the invention will make it possible to determine, from among the time slots not reserved for the network control traffic, a distribution of time slots to be allocated to different flows that can have different periods.

Figure 3:
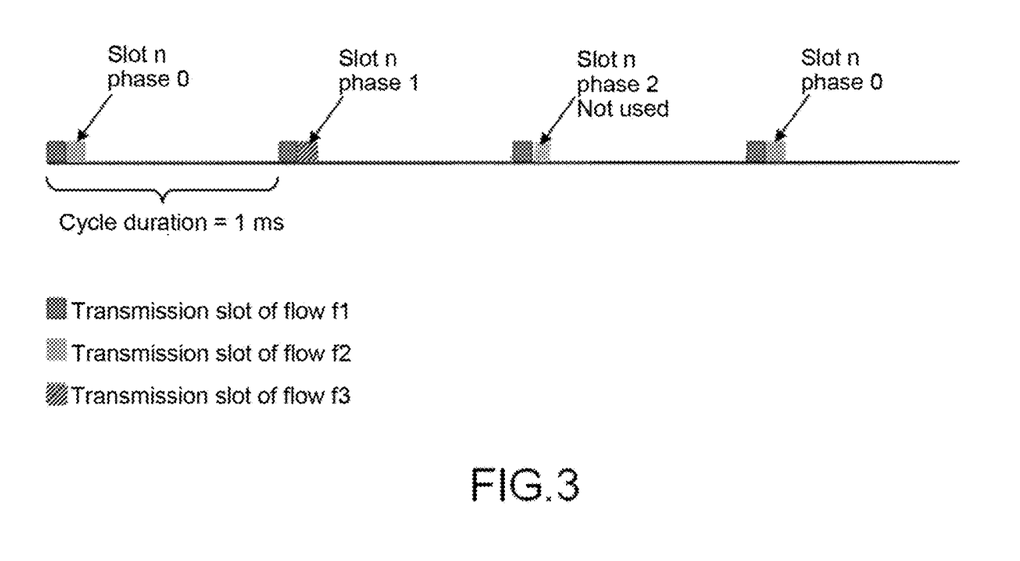
FIG. 3 illustrates an allocation of time slots for different TSN flows in a fixed duration Qbv cycle, according to one embodiment of the invention.

FIG. 3 illustrates the allocation of time slots for different TSN flows in a fixed duration Qbv cycle according to the invention. In this simplified example, the cycle is taken with a fixed duration equal to 1 ms, a first flow 'f1' is taken with a period of 1 ms, with a second flow 'f2' and a third flow 'f3' each having a period of 3 ms. The flow f1 then needs a time slot for each cycle, and the flows f2 and f3 need a time slot every three cycles.

In order to optimize the allocation and the use of the resources, in one embodiment, the method of the invention allows a parameter, called "phase", to be associated with the time slot that allows the occurrences of time slots that are not used to be identified and distributed over several flows. Thus, as illustrated in FIG. 3, with the time slot 'n' not being used (phase '2'), it then can be assigned to the flow f2 in phase '0', and assigned to the flow f3 in phase '1'.

Reserving time slots for a given flow will depend on the path to be taken by the flow, i.e., the different TSN switches that are traversed, and on the availability of the time slots in each of the visited TSN switches. Also, the more the topology of the network increases, the more the complexity of a time slot reservation algorithm increases. Indeed, the algorithm must be able to retrieve a time slot available on each visited switch and also be able to comply with the constraints of the flows in terms of latency. Moreover, if the algorithm must reassign certain time slots (already assigned to other existing flows) so that a new flow has the suitable time slot, such an algorithm must be able to check the impact of this reassignment on the schedules of the other switches.

Advantageously, the method of the present invention allows compliance with these constraints while reducing the complexity of the reservation algorithm. To this end, as already indicated, the cycle duration for running the algorithm is considered to be fixed and the same for all the TSN switches, and each cycle is divided into an identical number of time slots, with the duration of a time slot being considered to be equal to the time required to send the smallest frame of a flow, i.e., for an Ethernet flow, a time slot will be equal to the duration of a 64-byte frame. Also, for an Ethernet flow with 100-byte frames, the algorithm run by the method of the invention will reserve two time slots in each cycle for this flow.

The main idea involves distributing the time slots (outside those reserved for the control flow) of a given cycle between all the TSN access switches.

Figure 4A:
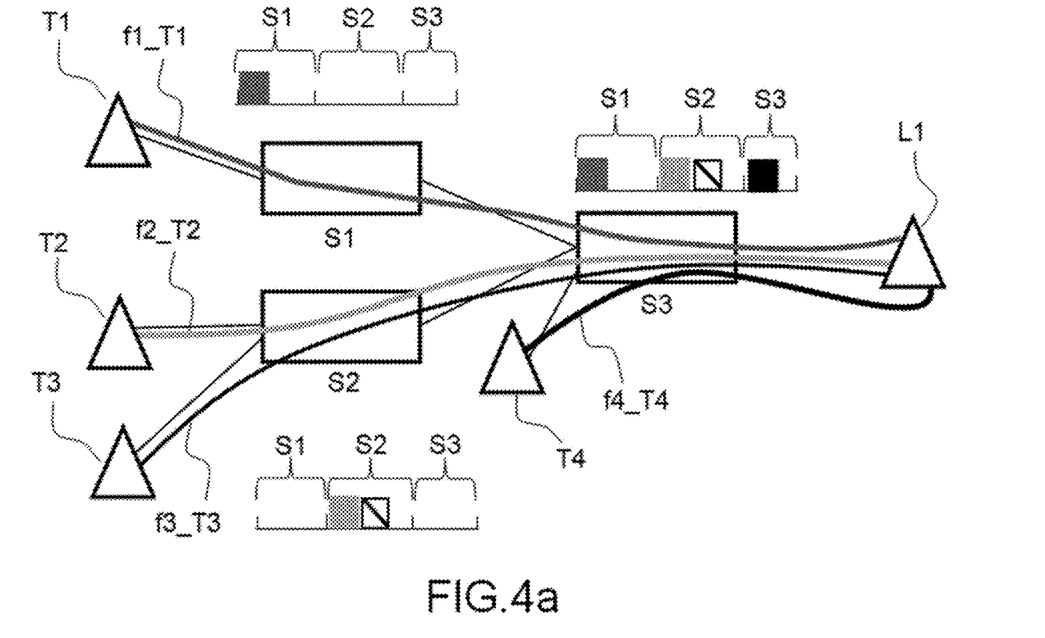
FIG. 4a illustrates an example of time slot distribution in a TSN network made up of three access switches, according to one embodiment of the invention.

FIG. 4a illustrates an example of the distribution of time slots according to one embodiment of the invention, in a TSN network made up of three TSN access switches (S1, S2, S3). A receiver terminal L1 connected to the network is subscribed to four transmitter terminals (T1, T2, T3, T4) connected to the network. The receiver terminal receives flows from each transmitter via different paths, with the flows passing through different switches. As illustrated, a flow f1_T1 transmitted by the transmitter T1 is transmitted to the receiver L1 via the switches S1 and S3, a flow f2_T2 transmitted by the transmitter T2 is transmitted to the receiver L1 via the switches S2 and S3, a flow f3_T3 transmitted by the transmitter T3 is transmitted to the receiver L1 via the switches S2 and S3, and a flow f4-T4 transmitted by the transmitter T4 is transmitted to the receiver L1 via the switch S3. This configuration can lead to a situation in which the four flows can "dispute" access to the egress port of the switch S3 that delivers the flows to the receiver terminal L1, and in which they can interfere with one another.

The application of the method of the invention allows the transmissions to the egress port of the switch S3 to be controlled, i.e., in terms of the management of the GCL, with an allocation of time slots distributed between all three switches S1, S2 and S3. The allocation of time slots for the flow f1_T1 exiting from T1 to S1 involves finding, in the switch S1, an available slot in the cycle from among the slots allocated to the switch S1. In the same way, the allocation of time slots for the flow f2_T2 exiting from T2 to S2 and the flow f3_T3 exiting from T3 to S2, involves finding, at the switch S2, available slots in the cycle from among the slots allocated to the switch S2. The same applies for the flow f4-T4 exiting from T4 to S3, where the allocation of time slots involves finding, at the switch S3, a time slot available in the cycle from among the slots allocated to the switch S3.

Advantageously, it is then no longer necessary to analyze or check the availability of time slots in all the switches of the network located on the path of a flow. A time slot simply needs to be found that is available at an egress port of the access switch receiving this flow (the first switch reached by a flow originating from a transmitter).

Moreover, the distribution of the time slots within each switch depends on the load of each switch in terms of the number of flows that pass through its egress port. Thus, the gauge is dynamic, the number of time slots allocated to a given access switch TSN can vary according to the number of flows passing through this switch.

The time slot allocation method of the invention allows dynamic distribution of the time slots between the different access switches of the network, as a function of the number of flows passing through each switch.

Figure 4B:
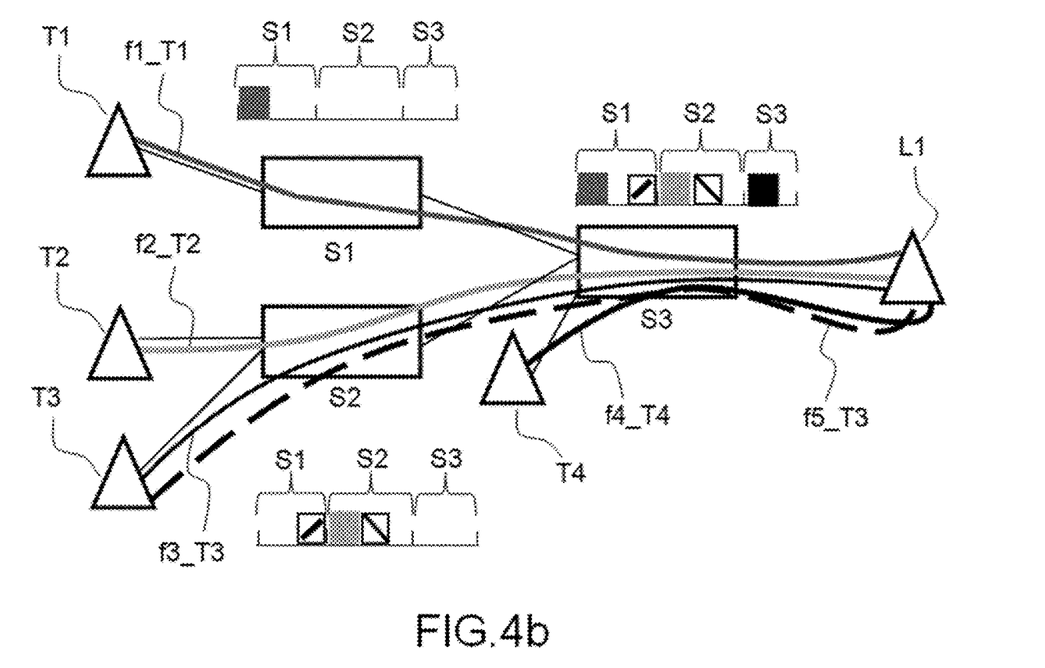
FIG. 4b illustrates an example of a change in the distribution of time slots as a function of the load of each access switch, according to one embodiment of the invention.

FIG. 4b provides an illustration of a change in the distribution of time slots as a function of the load of each switch, taking into account the number of flows associated with each switch. In this simplified example, a switch S1 is traversed by a single flow f1_T1 and a switch S2 is traversed by three flows, the flow f2-T2 transmitted by a terminal T2, the flow f3_T3 transmitted by a terminal T3, and the flow f5_T3 transmitted by the terminal T3. In this configuration, more flows therefore pass through the switch S2 than the switch S1. In such a case, the method of the invention allows the switch S2 to be able to retrieve, from the access switch S3 that is the output switch to the receiver L1, time slots not used by the switch S1, in order to allocate them to a flow of the switch S2. This is illustrated at the switch S3, by the flow f5_T3 appearing in the range of time slots allocated to the switch S1.

Figure 5:
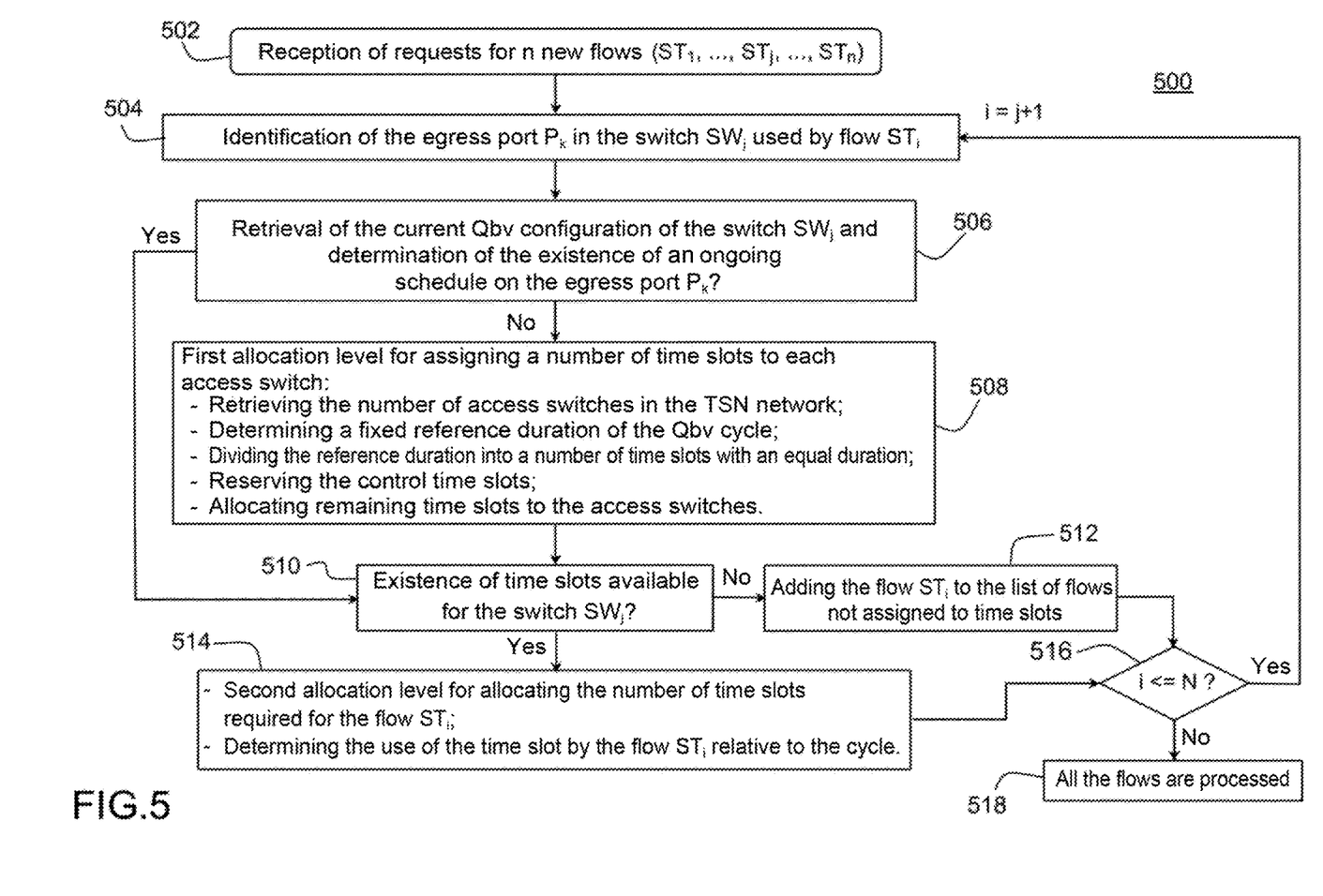
FIG. 5 is a flowchart of the steps of the method for reconfiguring the schedule for transmitting flows, according to one embodiment of the invention.

FIG. 5 is a flowchart of the steps of the method 500 for allocating time slots according to one embodiment of the invention. The steps are applied in a deterministic network of the TSN type made up of a plurality of TSN switches consolidating access switches $SW_i$ and core network switches, with the network being used by a plurality of transmitter terminals (Talkers) for sending data flows to receiver terminals (Listeners) via access switches and optionally core network switches according to a transmission schedule predefined by a time scheduler designed to separate the communication over the network into repeated fixed length time cycles, with the flows being able to comprise flows with a different priority, critical flows and non-critical flows.

The method that allows reconfiguration of the schedule of the transmission of flows comprises steps of:

Step 502: Receiving requests in order to admit new incoming flows ($ST_1, \ldots, ST_i, \ldots ST_n$) into the network. The method may run sequentially upon receiving a new request for adding one or more flows, running after a waiting time for receiving several requests, or running upon receiving a group of requests.

In one embodiment for receiving several new flows, the method can determine the priority of the flows and operate according to the priority level of these flows, by processing the highest priority flow first.

After receiving requests, the method proceeds to the next step.

Step 504: The method allows identification, for a new flow $ST_i$, of the egress port $P_k$ in the access switch $SW_j$ coupled to the terminal transmitting this flow, which will transmit this new flow $ST_i$ in the network.

Step 506: Retrieving the current configuration of the transmission schedule for the access switch $SW_j$ and determining if there is an ongoing schedule on the egress port $P_k$.

If so, the method continues with step 510 to determine whether time slots are available for the flow $ST_i$ from among all the time slots assigned to this access switch $SW_j$.

Returning to step 506, if there is no ongoing schedule for the egress port $P_k$, the method allows a new schedule to be generated that takes into account the new flow $ST_i$.

Step 508: The method runs a first level of allocating time slots for all the access switches of the network.

In one embodiment, step 508 comprises steps of:
  determining the number of access switches in the TSN network;
  retrieving a predefined value or computing a value for determining a fixed reference duration for a Qbv cycle. The reference duration is a fixed value, which can either correspond to the smallest period value from among the periods of critical flows received upon starting the system, or correspond to the greatest common divider of all the periods of the critical flows;
  dividing the fixed reference duration into a plurality of time slots of equal duration, with the duration of a time slot being equal to the time required to send the smallest frame of a flow from among the existing flows; and
  assigning, over the fixed reference duration and to each access switch, a number of time slots, from among the plurality of time slots, required in order for it to be transmitted, with the number of time slots allocated to each access switch depending on the number of existing flows passing through each access switch.

The expression "a number of time slots required for its transmission" refers to one or more time slots over a cycle.

In one embodiment, before assigning the time slots to the access switches, the method allows one or more time slots to be reserved at the start of a cycle for control flows for the network control traffic. The step of assigning each access switch a number of time slots from among the remaining time slots then occurs.

After allocating time slots to all the access switches, the method continues with step 510, by determining whether, from among all the time slots assigned to the access switch $SW_j$, time slots remain available for the flow $ST_i$.

Step 512: If not, i.e., if no time slot is available for the flow $ST_i$ from among all the time slots assigned to the access switch $SW_j$, the method allows the new flow $ST_i$ to be added to a list of flows without allocating time slots.

Step 514: If so, i.e., if there is at least one time slot available for the new flow $ST_i$ from among all the time slots allocated to the access switch $SW_j$, the method continues on a second allocation level in order to reserve the number of time slots that is required in order to transmit all the flow $ST_i$ (relative to the period of the flow).

This second allocation level for a new flow also makes it possible to determine whether a time slot needs to be reserved for each cycle or on different cycles as a function of the length of the frames of the flow. In one embodiment, the method uses the aforementioned 'phase' parameter, illustrated in FIG. 3, to identify the distribution of the flow over one or more cycles.

Step 516: When the allocation of the one or more time slots for the new flow $ST_i$ is completed, the method iterates steps 504 to 514 in order to process a new time slot allocation request for a new flow.

Step 518: When all the requests are processed with or without allocation of time slots for each flow, the main allocation method ends.

Once all the requests received for new flows are processed (according to the method 500 illustrated in FIG. 5), a supplementary method 600 allows the list of flows to be processed that have not received time slots (with these flows having been added to this list in step 512).

Figure 6:
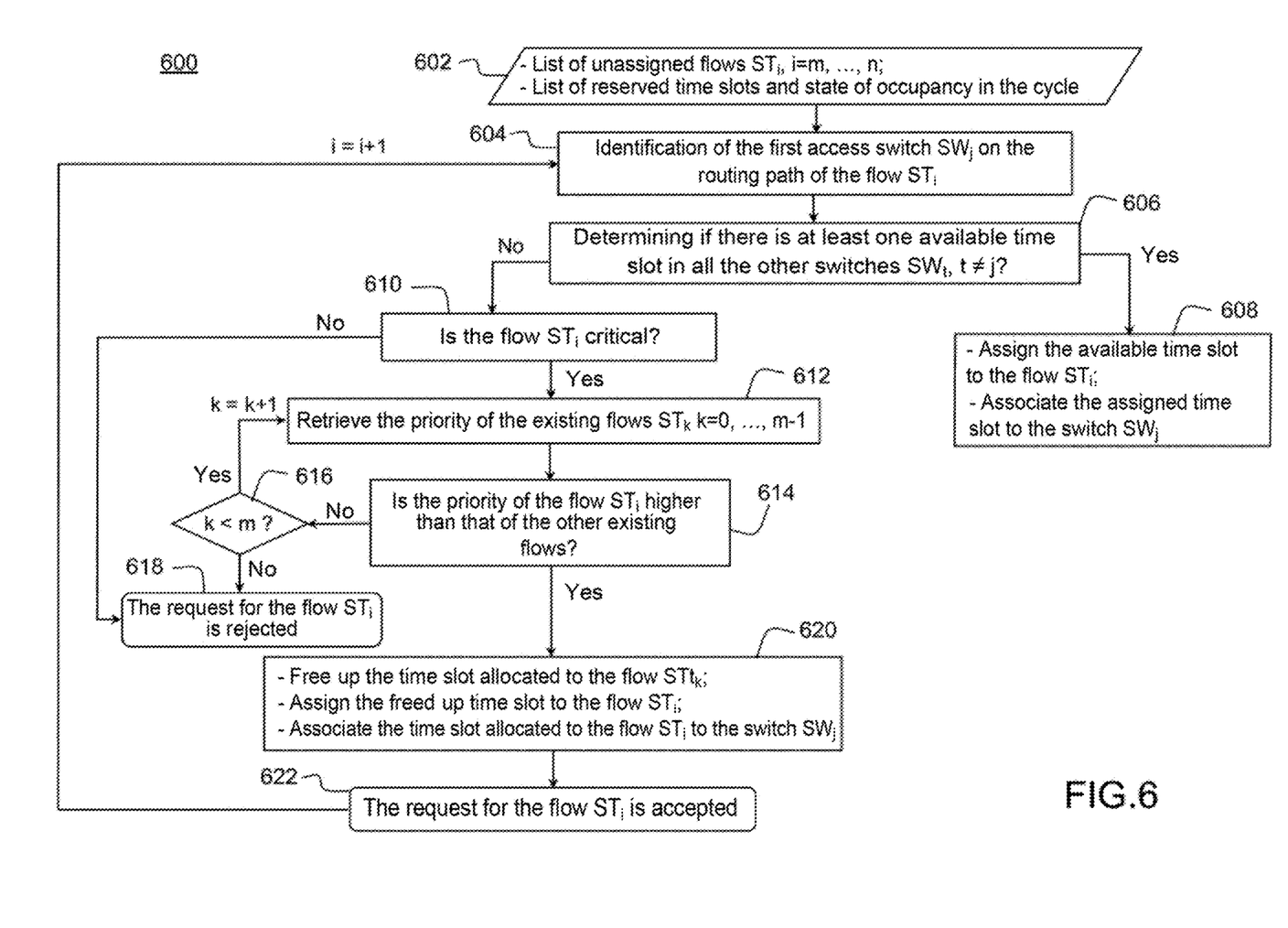
FIG. 6 is a flowchart of the steps of the method for retrieving available time slots not used by the other access switches, according to one embodiment of the invention.

FIG. 6 is a flowchart of the steps of the method 600 for processing the flows that have not been assigned to time slots by the initial allocation method 500. The method 600 will allow time slots to be recovered, if they exist, that are not used by other access switches and that are then available, and will allow them to be reallocated to all or some of the flows of the list of non-allocated flows.

In one embodiment, the method allows reallocation of the unused time slots to priority flows of the list of non-allocated flows.

The method 600 thus aims to identify, in all the time slots associated with the other switches, those that are not used. If unused time slots are identified, in one embodiment the method allows them to be reserved for high priority flows, and these time slots to be respectively associated with each access switch that is used by these priority flows.

As illustrated in FIG. 6, a first step 602 involves retrieving the list of unassigned flows $ST_i$, (i=m, . . . , n), and retrieving the time slot reservation list after the first allocation with the state of occupancy of the time slots over the cycles.

In a subsequent step 604, the method that iteratively runs in order to process each unassigned flow of the list, allows the first access switch $SW_j$ on the routing path of the flow $ST_i$ to be identified for the flow $ST_i$ that is processed.

In a subsequent step 606, the method is used to determine whether at least one available time slot exists (or whether an available time slot phase exists if the flow to be added has a period of more than one cycle time, with this precision no longer being used thereafter), in all the other switches $SW_t$, $t \neq j$, except for the identified first access switch $SW_j$.

If there is at least one available time slot (Yes branch of step 606), in step 608 the method allows this time slot to be reserved for the processed flow $ST_i$ and to be associated with the first identified switch $SW_j$.

Then, in the next step 622, the method allows the request to add the flow to be finalized and continues to process the next flow from the list of unassigned flows. In this step 622, the list of unassigned flows and the list of time slots reserved with their occupancy state are updated.

Returning to step 606, if at least one time slot available in all the other access switches has not been identified or if the number of remaining available slots does not allow the whole flow to be transmitted (No branch), in the next step 610, the method determines whether the analyzed flow $ST_i$ is a critical flow in terms of the critical TSN flows.

If it is not a critical flow (No branch of step 610), the method allows the request to add the flow $ST_i$ to be rejected in the next step 618, then loops back in order to process the next flow, with the list of unassigned flows being updated.

If it is a critical flow (Yes branch of step 610), in the next step 612, the method allows the priority of the existing flows $ST_k$ (k=0, ..., m−1) to be retrieved in order to check (steps 614, 616) if the priority of the analyzed flow $ST_i$ is greater than that of at least one of the other flows that have time slots.

If the priority of the analyzed flow $ST_i$ is lower than those of the existing flows (No branch of step 614), the method allows the request to add the analyzed flow $ST_i$ to be rejected (step 618), then loops back in order to process the next flow, with the list of unassigned flows being updated.

If the priority of the analyzed flow $ST_i$ is higher than the priority of an existing flow $ST_k$ (Yes branch of step 614), the method continues to step 620, which involves:

freeing up the time slot already allocated to the flow $ST_k$, the priority of which is lower than that of the flow $ST_i$ being processed;

allocating the freed-up time slot to the flow $ST_i$ being processed; and associating the time slot allocated to the flow $ST_i$ to the first access switch $SW_j$ identified on the routing path of the flow $ST_i$.

In the next step 622, the method then allows the request to add this new flow to be finalized, and loops back in order to process the next flow. In this step, the list of unassigned flows and the list of time slots reserved with their occupancy status are updated.

When all the requests for adding new flows have been processed, either by the single flow allocation method 500 (if time slots have been allocated to all the flows), or with the supplementary method 600 (for processing the flows of the list of unassigned flows), the TSN network has a new schedule for transmitting flows that complies with the specifications of standard IEEE 802.1.

The detailed description has focused on managing the allocation of time slots when a new flow appears. However, in the applications of interest to the method of the invention, the flows can be dynamic, in that a flow may appear or disappear.

The disappearance of a flow will involve freeing up a time slot that has been previously allocated thereto. The event that involves the disappearance of a flow can be processed by sending a "Leave request" type request that is sent by the application itself or even by the access switch that identifies that the time slot associated with this flow has not been used for several cycles (for example, after 4 cycles, if no transmission has been carried out for a given time slot, the access switch can send a "Leave request"). Once the disappearance request is received, it is processed in order to free up the corresponding time slot, which then becomes available for a new flow.

In terms of implementation, allocating a time slot involves a new entry into a "Gate Control List" (GCL) in order to open a gate to the queue to which the new flow is assigned in this time slot. Advantageously, the allocation of a time slot carried out by the method of the invention occurs without changing the duration of the Qbv transmission cycle.

The distribution of time slots between the access switches thus results in: in a switch $SW_j$, all the gates of all the queues are closed when its time slots are reserved for another switch $SW_k$. This ensures the exclusivity of the time slots for each of the access switches.

In one embodiment, the operational GCL configuration is updated at the end of the ongoing cycle in order to limit a problem of latency variation that can be experienced by the ongoing flows.

It should be noted that the Qbv cycle duration is defined during the initial phase, when the network starts and the first flows arrive. In order to limit the impact that a change of cycle duration could have on the performance capabilities of critical flows, the cycle duration is not changed during the operational phase of the TSN network. However, if the network ever reaches a significant state or percentage where new flow requests are rejected due to the lack of availability of time slots (for example, 70% of the requests are rejected), a complete reconfiguration of the network can be provided, which reconfiguration is scheduled for an appropriate time during which the cycle duration and the entire GCL schedule is reconsidered. For example, in the scenario of a factory, a complete reconfiguration can be scheduled for when the production lines are shut down.

In order to ensure the configuration and management of the TSN networks, standard IEEE 802.1 Qcc mainly proposes two approaches: a centralized approach and a distributed approach. The described method can be implemented in each of these two configurations.

Centralized Approach

Figure 7:
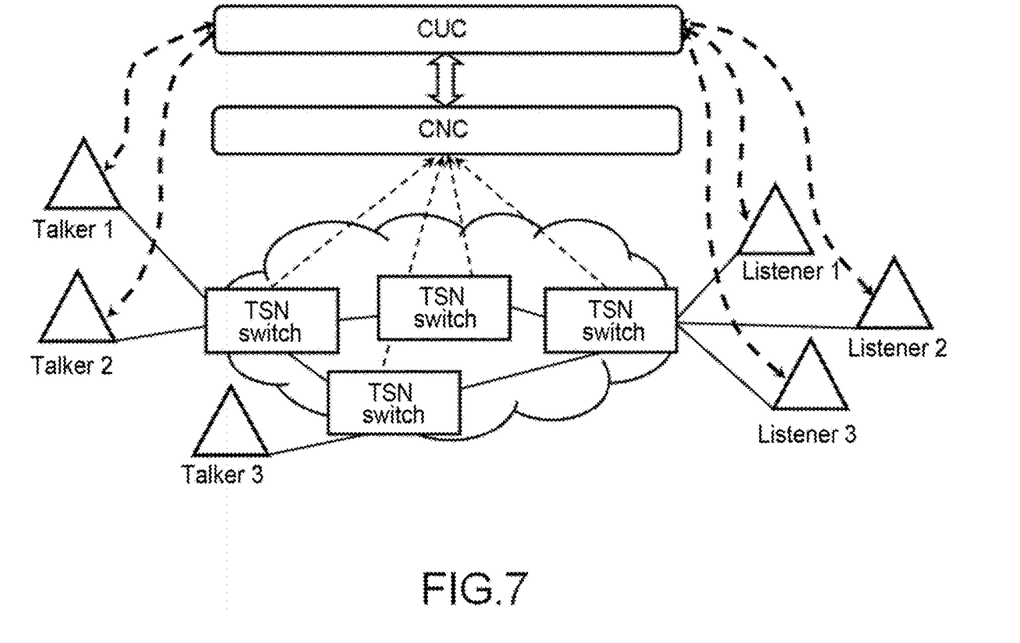
FIG. 7 illustrates a TSN network environment following a centralized IEEE 802.1 Qcc approach, allowing the method of the invention to be implemented.
Figure 8:
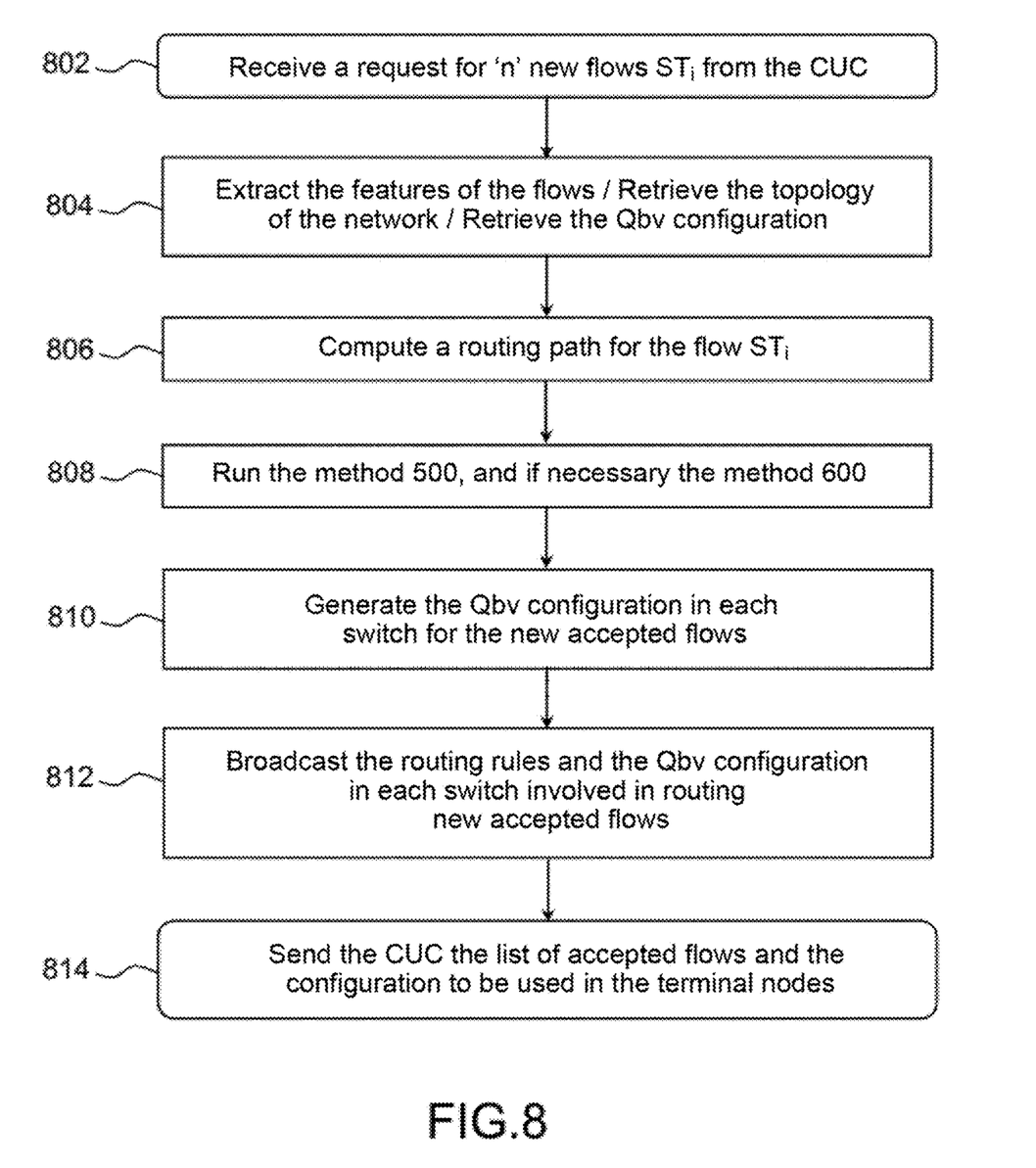
FIG. 8 is a flowchart for illustrating various steps of the method for reserving network resources for new flows in a centralized network environment, according to one embodiment of the invention.

The centralized approach provided by standard IEEE 802.1 Qcc is illustrated in FIG. 7, and FIG. 8 shows a flowchart of the steps of the method for reserving network resources for new flows according to the invention as implemented in a centralized approach.

The set of TSN switches of the network is controlled, managed and configured by a centralized CNC ("Centralized Network Configuration") entity. The terminals (Talkers/Listeners) that will use the TSN network send the features of their flow to a CUC ("Centralized User Configuration") entity using third-party software ("middleware") such as, for example, OPC UA, ROS, DDS . . . . The role of the CUC entity is to consolidate the requests from the terminals/applications to use the TSN network and to send them to the CNC entity. The requests are analyzed by the CNC while having the information concerning the current capabilities of the TSN network. If it is possible to reserve resources for new flows, the CNC responds to the CUC indicating that these terminals/applications can use the network. The CNC can also provide these terminals/applications with the slot to be used (i.e., when to start to use the network). For example, it can ask an application to start sending its data in x milliseconds. In the event that reserving resources is impossible for certain flows, the CNC rejects the requests associated with these flows. In this approach, the method of the invention can be implemented and launched on the CNC.

Thus, in a first step 802, the CNC receives a request from the CUC to accept 'n' new flows $ST_i$. The CNC extracts the features of the flows, retrieves the topology of the network and the Qbv configuration (step 804).

Then, in the next step 806, it computes a routing path for a flow $ST_i$ to be processed.

The next step 808 involves running the method 500 for allocating resources described with reference to FIG. 5 and optionally followed by the supplementary method 600 described with reference to FIG. 6.

When all the flows have been processed (with or without time slot allocation), the CNC allows (step 810) the Qbv configuration to be generated in each switch for the new accepted flows, then (step 812) allows the routing rules and the Qbv configuration to be broadcast in each switch involved in routing new accepted flows.

Finally, the CNC sends (step 814) the CUC the list of accepted flows and the configuration to be used in the terminal nodes.

Distributed Approach

Figure 9:
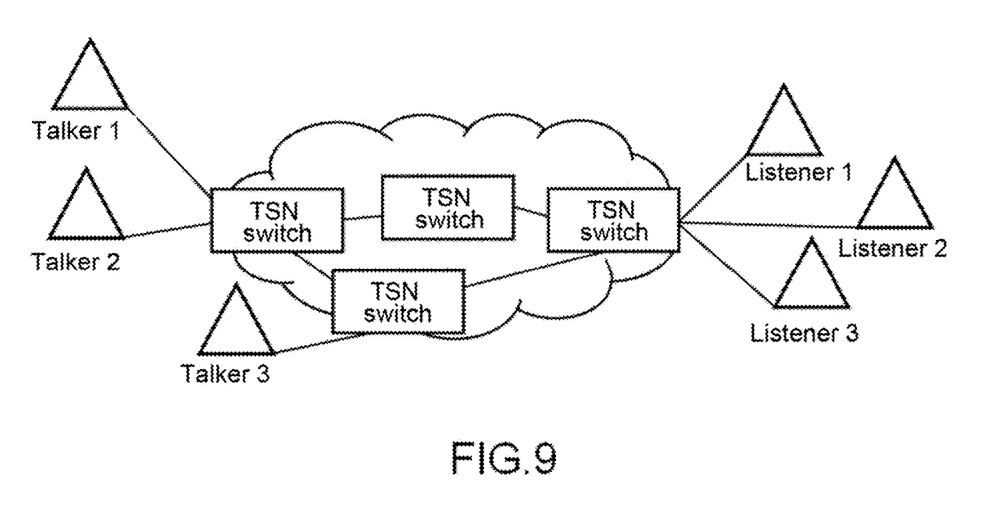
FIG. 9 illustrates a TSN network environment following a distributed IEEE 802.1 Qcc approach, allowing the method of the invention to be implemented.

In the case of distributed network management, as illustrated in FIG. 9, an initial phase is required when the TSN access switches have to exchange messages with one another in order to converge toward a distribution of time slots. Once the convergence is obtained, each access switch allocates a time slot for the new flow from among the time slots associated therewith, and it then propagates this information to the core switches of the TSN network so that they integrate this new reservation.

Embodiments of the invention have been described that have advantageous features, which are mainly:
distribution of the time resources between access switches of a TSN network, which distribution is dynamic and varies as a function of the number of flows served by each access switch;
a method that allows time resources to be quickly reserved in a TSN network for each new flow, in a dynamic manner based on the features of the new flow, without having to use off-line simulation tools or mathematical modeling;
fast on-line allocation of time resources, as and when new flows arrive.

The invention claimed is:

1. A method for dynamically reconfiguring a schedule for transmitting data flows in a time-sensitive deterministic network, with the data flows being transmitted by transmitter terminals to receiver terminals via switches consolidating access switches $SW_j$ coupled to the transmitter and receiver terminals, and network core switches for routing the flows between the access switches, with the switches being configured to apply flow transmission cycles according to a flow transmission schedule defined by a time scheduler, the method being computer-implemented and comprising steps of:
   receiving at least one request to add a new flow $ST_i$ to the network, with the new flow having to be transmitted from a transmitter terminal to an access switch $SW_j$;
   determining whether a flow transmission schedule is ongoing for said access switch $SW_j$ by:
   identifying an egress port $P_k$ of said access switch $SW_j$ in order to transmit the new flow in the network;
   retrieving a current configuration of the transmission schedule for said egress port $P_k$; and
   determining whether a flow transmission schedule is ongoing on said egress port $P_k$;
   determining, if a flow transmission schedule is ongoing, whether there are sufficient time slots available in order for the access switch $SW_j$ to transmit the new flow according to the current configuration of the transmission schedule; or
   if no flow transmission schedule is ongoing:
   computing a new flow transmission schedule such that: a duration of each transmission cycle is the same for all the switches of the network;
   each transmission cycle comprises the same number of time slots for transmitting the flows; the time slots of a given cycle are distributed between all the access switches of the network; and
   determining, for the access switch $SW_j$, if there are sufficient time slots available, from among the number of time slots allocated thereto, in order to transmit the new flow according to the new schedule; and
   allocating the time slots required for the transmission of said new flow thereto, if there are sufficient time slots available in order for the access switch $SW_j$ to transmit this new flow according to the current schedule or according to the new schedule.

2. The method as claimed in claim 1, wherein the step of computing a new flow transmission schedule comprises steps of:
   determining the number of access switches in the network;
   retrieving a predefined value or computing a value for a fixed reference duration for a transmission cycle;
   dividing the fixed reference duration into a plurality of time slots of equal duration, with the duration of a time slot being equal to the time required to send the smallest frame of a flow from among the existing flows; and
   assigning each access switch a number of time slots from among the plurality of time slots over the fixed reference duration, with the number of time slots allocated to each access switch depending on the number of existing flows passing through each access switch.

3. The method as claimed in claim 2, wherein the predefined or computed value of the fixed reference duration corresponds either to the smallest period value from among the periods of critical flows received upon starting the system, or to the greatest common divider of all the periods of the critical flows from among the existing flows.

4. The method as claimed in claim 1, comprising, before the step of allocating time slots for a new flow, a step comprising reserving one or more control time slots for the network control traffic.

5. The method as claimed in claim 1, comprising, after the step of determining whether there are sufficient time slots available in order for the access switch $SW_j$ to transmit the new flow according to the current schedule or according to the new schedule, a step of adding the new flow to a list of flows without allocating time slots, if there are no sufficient time slots available for transmitting the new flow.

6. The method as claimed in claim 5, further comprising steps of processing the list of flows without allocating time slots, with said steps involving searching for a non-allocated flow, if time slots exist that are not used by the other access switches other than the one receiving said non-allocated flow, and, if so, steps involving allocating at least one of said unused time slots to said non-allocated flow according to the priority of said non-allocated flow.

7. The method as claimed in claim 6, further comprising, if no time slots exist that are not used by the other access switches other than the one receiving said non-allocated flow, steps involving determining whether said flow has a higher priority than an existing flow, and, if so, steps involving freeing-up the time slots from an existing lower priority flow in order to allocate it to said non-allocated flow.

8. A computer program product, said computer program comprising code instructions for carrying out the steps of the method as claimed in claim 1, when said program is executed on a computer.

9. A device for dynamically reconfiguring a schedule for transmitting data flows in a time-sensitive deterministic network, with the data flows being transmitted by transmitter terminals to receiver terminals via switches consolidating access switches $SW_j$ coupled to the transmitter and receiver terminals, and network core switches for routing the flows between the access switches, with the switches being configured to apply flow transmission cycles according to a flow transmission schedule defined by a time scheduler, the device comprising means for implementing the steps of the method as claimed in claim 1.

10. The use of the device as claimed in claim 9 in a time-sensitive network implementing a centralized network architecture, notably an architecture according to the "Software Defined Networking" model.

11. The use of the device as claimed in claim 9 in a time-sensitive network implementing a distributed network architecture.

12. The use of the device as claimed in claim 9 in a time-sensitive deterministic network TSN implementing the specifications of standard IEEE 802.1.

\* \* \* \* \*